Oct. 9, 1962  D. J. NUTKINS ET AL  3,057,589
AERIAL DEVICE HAVING ROTOR FOR RETARDING DESCENT
Filed March 14, 1958  3 Sheets-Sheet 1
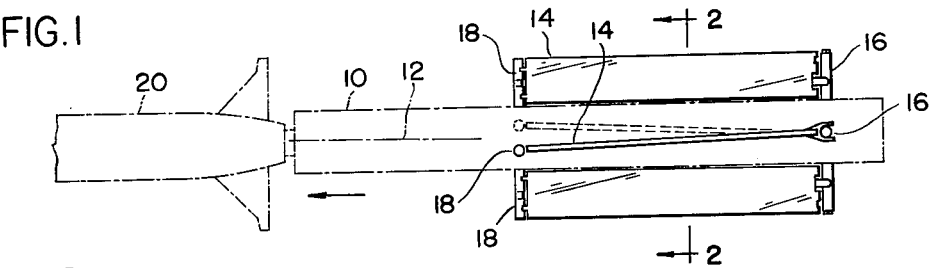
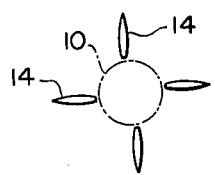
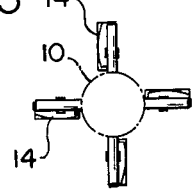
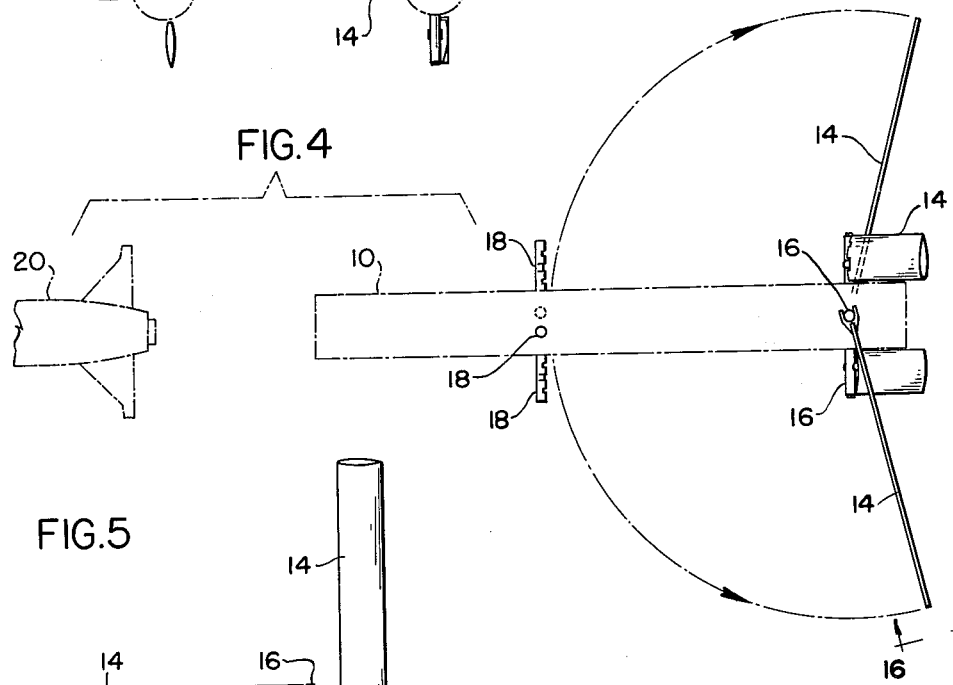
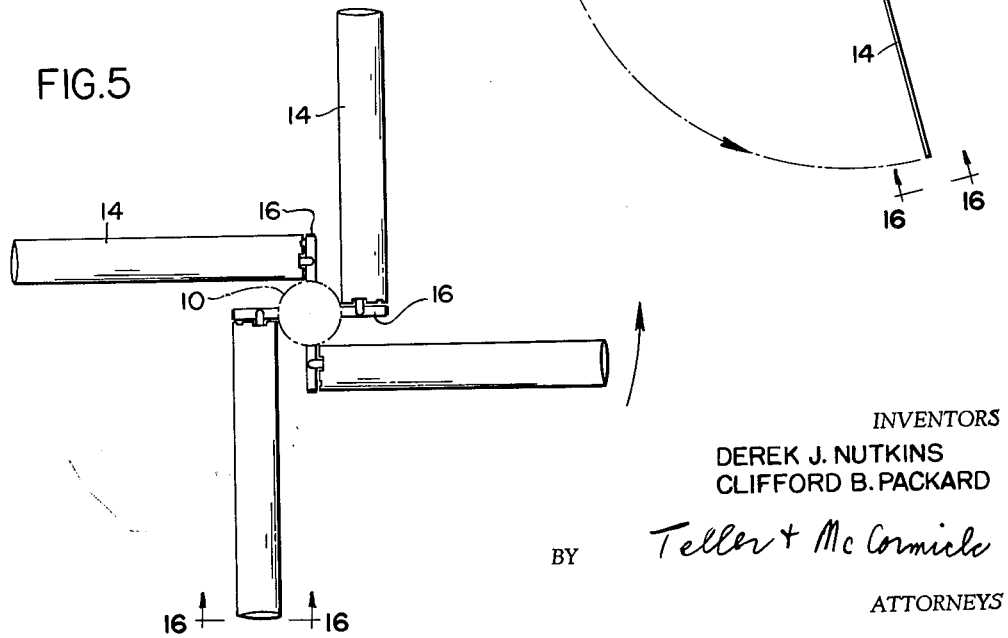
INVENTORS
DEREK J. NUTKINS
CLIFFORD B. PACKARD
BY  *Teller + McCormick*
ATTORNEYS

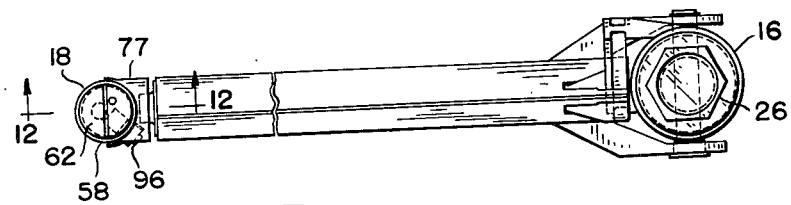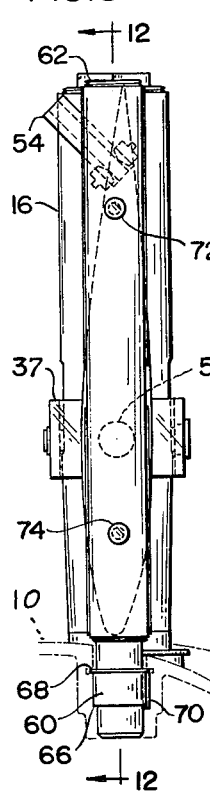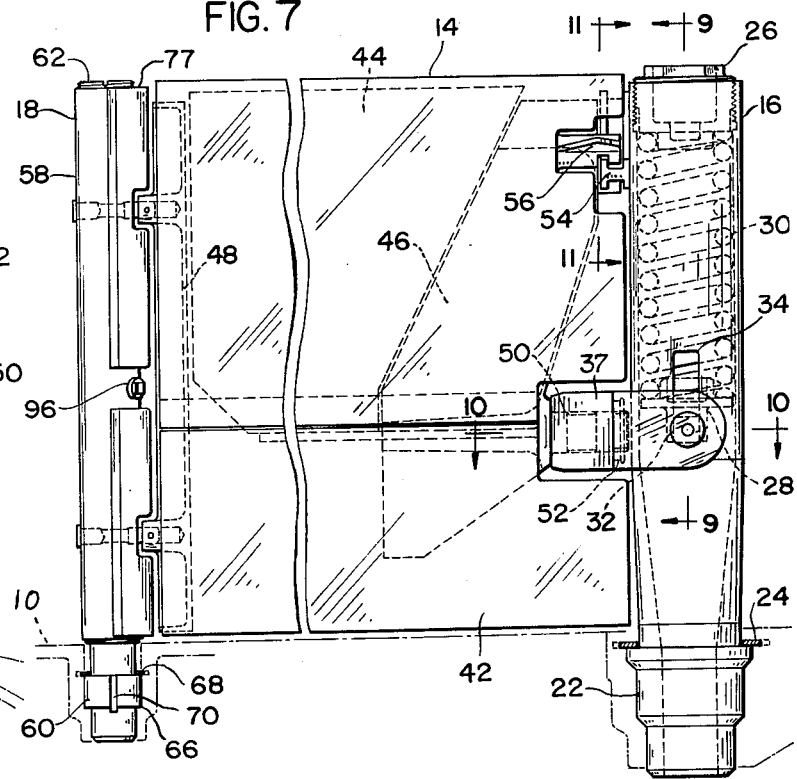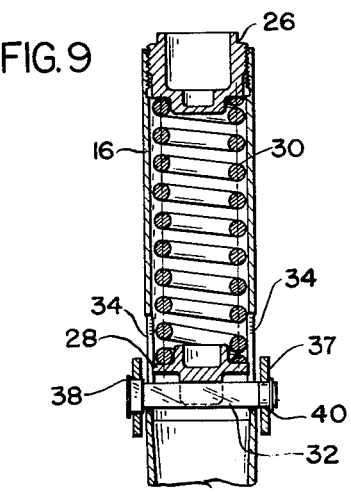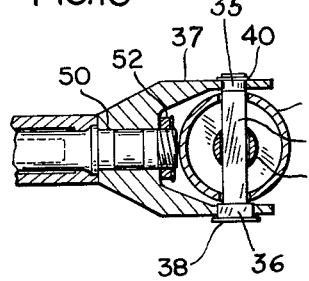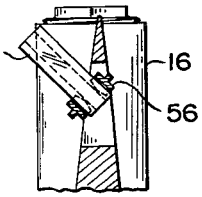

Oct. 9, 1962     D. J. NUTKINS ET AL     3,057,589
AERIAL DEVICE HAVING ROTOR FOR RETARDING DESCENT
Filed March 14, 1958     3 Sheets-Sheet 3
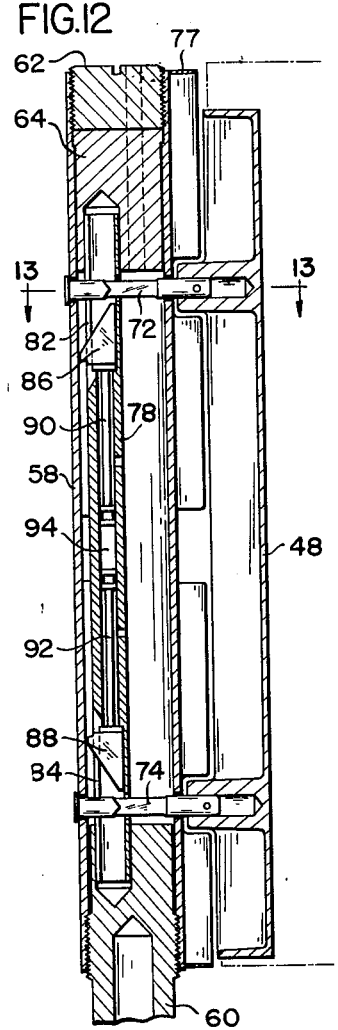
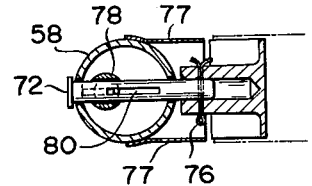
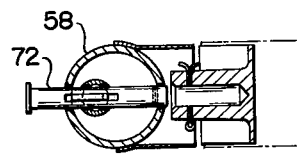
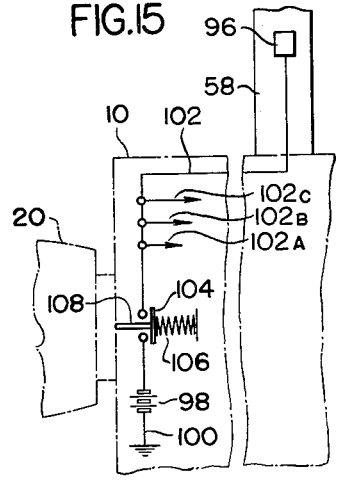
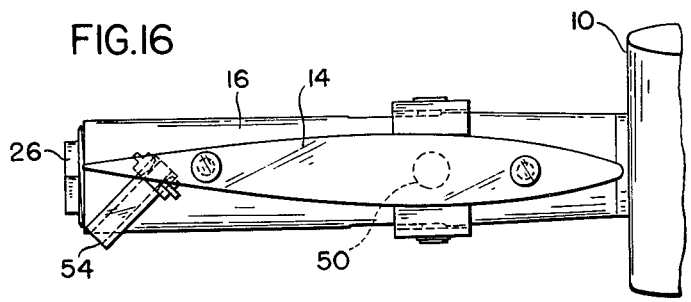
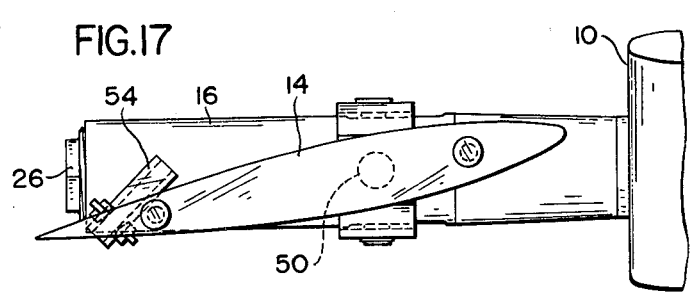
INVENTORS
DEREK J. NUTKINS
CLIFFORD B. PACKARD
BY *Teller & McCormick*
ATTORNEYS 3,057,589
AERIAL DEVICE HAVING ROTOR FOR
RETARDING DESCENT
Derek J. Nutkins, New Britain, and Clifford B. Packard, Glastonbury, Conn., assignors to The Kaman Aircraft Corporation, Bloomfield, Conn., a corporation of Connecticut
Filed Mar. 14, 1958, Ser. No. 721,606
24 Claims. (Cl. 244—138)

The invention relates to an aerial device having a rotor for retarding descent, said device being in many respects similar to that disclosed in the Wannland and Rhodes application Serial No. 504,166 filed April 27, 1955, now Patent No. 2,978,211 and entitled "Aerial Device Having Rotor for Retarding Descent." A device embodying the invention may be released in mid-air in any of a variety of ways, and the rotor then autorotates in such a manner as to retard the descent.

One object of the invention is to provide a device of the class stated having some of the features of novelty and the advantages of the device of the prior application, but having rotatable blades initially located with respect to the main body in a manner to conserve space but to be nevertheless instantly available for movement to autorotative positions.

Another object of the invention is to arrange the rotatable blades in relation to the main body so that they are particularly well adapted for retarding descent and so that they also serve as guide vanes for said body during initial movement thereof and prior to the release of the body for retarded descent.

Another object of the invention is to provide advantageous structural features for connecting the rotatable blades with the main body so that the blades are initially held and are thereafter permitted to move to operative autorotative positions and so that the pitch angles of the blades in said autorotative positions are automatically adjusted to regulate the speed of autorotation and the rate of descent.

Still another object of the invention is to provide an aerial device of the class stated wherein said device is one unit of a multiple unit missile assembly which is adapted for free flight along a trajectory while free from any external supporting means, and wherein the rotatable blades are released after an extensive period of flight to permit said blades to move to operative positions for autorotation to retard descent of the device. More specifically stated, the unit of the missile assembly may be a booster unit, and the rotatable blades serve to retard descent of the case of the booster unit after said booster unit has served its purpose.

The drawings show an embodiment of the invention wherein the device includes the case of a booster unit of a missile assembly and such embodiment will be described, but it will be understood that various changes may be made from the construction disclosed, and that the drawings and description are not to be construed as defining or limiting the scope of the invention, the claims forming a part of this specification being relied upon for that purpose.

Of the drawings:

FIG. 1 is a schematic side view of a missile assembly including a unit which embodies the invention.

FIG. 2 is a transverse sectional view, partly schematic, taken along the line 2—2 of FIG. 1.

FIG. 3 is a rear or right end view of the mechanism as shown in FIG. 1.

FIG. 4 is a view somewhat similar to FIG. 1, but showing the missile separated from the booster unit or mechanism and showing some of the parts of the booster unit or mechanism in different relative positions.

FIG. 5 is a rear or right view of the mechanism as shown in FIG. 4.

FIG. 6 is an enlarged plan view of one of the blades and associated parts as shown in FIG. 1.

FIG. 7 is a side view of the parts shown in FIG. 6.

FIG. 8 is a left end view of the parts shown in FIGS. 6 and 7.

FIG. 9 is a transverse sectional view taken along the line 9—9 of FIG. 7.

FIG. 10 is a longitudinal sectional view taken along the line 10—10 of FIG. 7.

FIG. 11 is a fragmentary transverse view taken along the line 11—11 of FIG. 7.

FIG. 12 is an enlarged fragmentary longitudinal sectional view taken along the lines 12—12 of FIGS. 6 and 8.

FIG. 13 is a fragmentary longitudinal sectional view taken along the line 13—13 of FIG. 12 and showing one of the blade retaining pins.

FIG. 14 is a view similar to FIG. 13, but showing the pin in withdrawn position.

FIG. 15 is a diagram of electrical connections.

FIG. 16 is an enlarged fragmentary view taken in the direction of the arrows 16, 16 in FIGS. 4 and 5.

FIG. 17 is a view similar to FIG. 15, but showing the blade in a different relative position.

GENERAL DESCRIPTION

Referring to the drawings and more particularly FIGS. 1 to 5 thereof, 10 represents a body having a longitudinal central axis 12 which body may be released in mid-air and which must then descend at a retarded speed. For retarding the descent, said body 10 carries a plurality of airfoil blades 14, 14 which are rotatable about the axis of said body and serve to retard descent in a manner to be hereinafter more fully explained. The number of blades may be varied, but four blades are shown.

The blades 14, 14 are uniformly spaced circumaxially with respect to the body 10 and said blades are connected with the body at the rear portion thereof. They may be directly connected with the body so that the body and the blades rotate in unison about the body axis 12. The blades are connected with the body for movement in fixed paths relatively thereto. Preferably and as shown, the blades 14, 14 are movable about transverse pivotal axes in fixed relation to the body or at least in fixed relation to the axis thereof and said fixed pivotal axes are ordinarily radial. When the blades 14, 14 are in their operative positions as shown in FIGS. 4 and 5, they extend generally outwardly from the body 10 and they are at pitch angles suitable to cause autorotation for retarding descent of said body.

When the pivotal axes for the blades are radial, said axes may be provided by means of radial pivot posts 16, 16 projecting from the rear portion of the body 10. When such posts are provided, the blades are equally spaced transversely from the longitudinal axis 12.

The body 10 may be initially movable forwardly in the direction of the arrow in FIG. 1 and it is shown as being movable horizontally although the exact direction is not essential. Preferably and as shown in said FIG. 1, the blades 14, 14 initially extend forwardly and are initially in generally longitudinal positions. With the blades initially extending forwardly from their pivotal axes, they are closely adjacent the body and there is a considerable conservation of space, particularly as to length. When the blades 14, 14 are in their said generally longitudinal positions, they are preferably so located that their central planes are substantially radial and extend approximately through the central axis 12, as will be evident from FIG. 2.

Means are provided, as hereinafter described, for initially retaining the blades in their said generally longitudinal positions, said retaining means being indicated generally at 18, 18. Means are also provided which are operable at a suitable time to release the several blade retaining means 18, 18 so as to permit the blades 14, 14 to move in substantial unison to generally outward positions as shown in FIGS. 4 and 5. The blades so move in fixed paths and when they have transverse or radial pivotal axes, they swing outwardly and rearwardly about said axes. The blades move as indicated by the arrows in FIG. 4, and the blades move to the before-mentioned operative positions. When the blades are in the relative positions shown in FIGS. 4 and 5, the center of gravity of the body is ahead of the blades, and the body swings downward toward a vertical position as shown in FIGS. 16 and 17.

The body 10 may be a portion of one unit of a missile assembly which is adapted for free flight along a trajectory while free from any external supporting means. A means is provided which is operable after an extensive period of flight for releasing the blades for movement to their said operative positions.

The missile unit to which the invention particularly relates is shown as being a booster for a missile 20. When the unit is a booster the body 10 is the case of the booster and it is adapted for containing a combustible charge and it is open at the rear for the discharge of propellent gases. The body or case 10 during initial flight abuts against or otherwise engages the missile 20 and has its central axis 12 coincident with the central axis of the missile. The gases discharged from the booster case apply force to the missile 20 for driving it and accelerating the flight thereof. When the explosive charge in the booster case has been expended, the booster no longer drives the missile and becomes disengaged and separated therefrom as shown in FIG. 4. When the case has become separated from the missile 20, the blade retaining means 18, 18 are released and the blades then move to their operative positions and they autorotate so as to retard the descent of said case 10 in the forward direction.

During the initial flight and while the case 10 is in engagement with the missile 20, the blades 14, 14 are held in their said generally longitudinal positions by said retaining means 18, 18 and as shown they serve as guide vanes for assisting in the control of flight. The blades or vanes 14, 14 are preferably at slight angles of inclination with respect to the longitudinal axis 12 of the case 10 as shown in FIG. 1, and said vanes thus serve to effect twirling motion of said case. As shown, the vanes 14, 14 are so inclined that the twirling motion is counterclockwise as viewed from the rear.

The described inclinations of the vanes or blades 14, 14 also serve to insure the said outward and rearward movements thereof from their generally longitudinal positions as shown in FIG. 1 to their generally outward operative positions as shown in FIGS. 4 and 5. In their operative positions, the blades are inclined rearwardly and their pitch angles are such as to cause autorotation for retarding the descent of the body or case 10. It will be understood that, upon movement of the blades to operative positions, the attitude of the body or case 10 quickly shifts from the generally horizontal position shown in FIG. 4 to an approximately vertical position as shown in FIGS. 16 and 17.

In order to control the speed of autorotation, a means is provided which is automatically dependent upon variations in said speed for changing the pitch angles of the blades in the positive direction as the rotational speed is increased and for changing said pitch angles in the negative direction as the rotational speed is decreased. This speed responsive pitch changing means serves to maintain an optimum speed of rotation and an optimum rate of descent. Said speed responsive means, as presently preferred, is hereinafter described in detail.

*Pivoting and Pitch Changing Means for Blades*

As has been stated, each blade 14 is preferably carried by a radial post 16 on the body 10, this post and its associated parts being shown in detail in FIGS. 6 to 11. The post is positioned radially and it is preferably rotatable with respect to said body 10. As shown, the post has a bearing portion 22 fitting a bearing opening in a boss within the main shell of the body or case 10. The post is held in place by an expansible retaining ring 24. The main portion of the post 16 is hollow and the post is closed at its outer end by a threaded plug 26.

Slidably mounted within the post for inward or outward movement is a member 28, and a coil compression spring 30 is interposed between said member 28 and said plug 26. The member 28 has a rectangular transverse notch at its bottom and a rectangular bar 32 fits said notch and also fits two opposite similar slots 34 in the plug 16. The projecting portions 35 and 36 of the bar 32 immediately adjacent the outer wall of the post 16 are cylindrical. A yoke 37 is provided which has arms at the sides of the post and said arms are apertured to receive and fit the cylindrical portions 35 and 36 of said bar. Lengthwise movement of the bar 32 is prevented by a head 38 at one end and by a split ring 40 near the other end.

The member 28 and the bar 32 and the yoke 37 collectively constitute a blade carrier which is movable outwardly and inwardly along the post, outward movement being opposed by the spring 30. Movement in the inward direction is limited by the engagement of the bar 32 with the inner ends of the slots 34.

The details of structure for the blade 14 are not essential so far as the present invention is concerned. As shown, the blade comprises a spar 42 at the inner or leading edge, a honeycomb section 44 between the spar and the outer or trailing edge, an inboard or root metallic member 46, and an outboard or tip metallic member 48, said members 46 and 48 being connected with the spar and with the honeycomb. The inboard member 46 carries a pivot pin 50 extending lengthwise of the blade and fitting a bearing aperture in the yoke 37. The pivot pin is held in place by a nut 52. The pin 50 provides a pivotal pitch axis about which the blade is adjustable.

When the several blade retaining means 18, 18 are released, the blades swing rearwardly and outwardly about the axes of the posts 16, 16 approximately to their operating positions. Simultaneously with or immediately following the rearward and outward movements of the blades, the blade carriers and the blades move outwardly in opposition to the spring 30, this outward movement being due to centrifugal action of the blades themselves and being proportionate to speed of rotation. The posts 16, 16 and parts directly associated therewith constitute means operative when the blades are in their outward position for locating them at pitch angles different from the fixed angles of the pivotal axes of said blades which pitch angles are effective for causing autorotation and for thereby retarding descent. Means is provided for adjusting the pitch angles of the blades about the axis of the pins 50 and in accordance with the last said outward movements. This means may be varied as to details, but the presently preferred means includes an inclined cam bar 54 which is rigidly connected with the post 16, as best shown in FIG. 11. A fork 56 on the member 46 engages the bar 54 at the opposite sides thereof. Due to the inclination of the bar, the blade is angularly adjusted in accordance with outward or inward movement thereof.

*Blade Retaining and Releasing Means*

The blade retaining means 18 and the releasing means therefor may be widely varied as to details but the presently preferred construction, as shown in FIGS. 12 to 15, includes an approximately radial post 58 rigidly connected with the body or case 10. As shown, the post comprises a tube engaging an inner plug 60 and having an outer plug 62. The inner plug 60 has threaded engagement with the tube 58 and the outer plug 62 engages a non-rotary cylindrical body or plug 64 within the tube. The inner plug 60 has a seating portion 66 fitting an opening in a boss within the main shell of the body or case 10. The plug 60 is held in place by an expansible retaining ring 68, and it is held against rotation by a key 70.

At least one latch or pin is provided on the post or tube 58 for engaging and retaining the blade, said latch or pin being movable to disengage the blade. Preferably and as shown in FIG. 12, there are two such pins which are designated by 72 and 74. Each of these pins has its major portion within the tube 58 and it extends through a hole in the tube 58 and toward the blade into a hole in the blade tip member 48. Each of the pins is initially held in place by a cotter pin 76. The space between the tube 58 and the blade member 48 is partly closed by opposite sheet metal members 77, 77.

Means is provided for simultaneously withdrawing the retaining pins 72 and 74 for all of the blades. This means is automatically operable after a period of flight and, when there is an associated missile such as 20, it is preferably dependent for its action upon the separation of disengagement of the booster case 10 from said missile. The presently preferred means for this purpose will be described.

A tube 78 is located within the tube 58 with its ends in holes in the plugs 60 and 64. The central hole in the tube is enlarged at its inner and outer end portions. The tube 78 is apertured to receive the pins 72 and 74, and each of said pins has a longitudinal slot 80 therein. The tube 78 has slots 82 and 84 therein within which beveled cam members 86 and 88 are oppositely movable, said cam members being adapted respectively to enter the slots 80 in the pins 72 and 74. Although the cam members are adapted to enter the slots 80 in the pins, they are initially below and above said pins as shown. Connected with the members 86 and 88 are downwardly and upwardly extending stems 90 and 92 movable in the smaller portion of the central hole in the tube 78, said stems having enlargements at their lower and upper ends which fit said smaller portion of the hole and constitute pistons. Adjacent and between the pistons on the stems 90 and 92 is an explosive cartridge 94. Carried by the tube 58 and located immediately adjacent the cartridge 94 is an igniter plug 96.

An electric circuit for the igniter plug 96 is shown in FIG. 15. A battery 98 within the case 10 is connected with the plug 96 and with suitable grounding connections by means of conductors 100 and 102. Other conductors 102ᵃ, 102ᵇ and 102ᶜ connect the conductor 100 with the plugs for the other blades. Interposed in the conductor 100 is an initially open switch 104 adjacent the leading end of the case 10, said switch being spring biased to its closed position by a spring 106. The switch 104 is connected with a forwardly projecting stem 108 which initially abuts against the rear of the missile 20. So long as the booster case and the missile remain in their initial relationship, the switch 104 is held open, but it is automatically closed as soon as the booster case is separated from the missile. Upon the closing of the switch 104, circuits are established to the several igniter plugs 96 and the several cartridges 94 are exploded.

Upon the explosion of each cartridge 94, the corresponding stems 90 and 92 are driven upwardly and downwardly and the cam elements 86 and 88 are similarly moved. As the cam elements 90 and 92 move upwardly and downwardly, the pins 72 and 74 are moved forwardly, the cotter pins 76 being sheared. With the pins 72 and 74 for the several blades moved forwardly, said blades are free to move, and they then move as previously described to their operative positions. The elements 86 and 88 constitute means carried by the body or case 10, and more specifically carried by the posts 18, 18, for withdrawing the latches 72 and 74 out of engagement with the blades. Said elements 86 and 88 are movable separately from said latches to effect the release thereof.

Summary of Operation

When the blades 14, 14 initially extend forwardly and have their central planes radial, as is preferred, they serve as guide vanes for the body 10 and said vanes are preferably inclined to give the body a twirling motion. The blades are initially held in their forward positions by the retaining means 18, 18, and after a period of flight the several retaining means are released as hereinbefore described to permit the blades to move rearwardly and outwardly to their operating positions for retarding descent. When the body 10 is the case for a guided missile booster unit, the means for releasing the blade retaining means is pendent upon separation of the case from the missile, the switch 104 and associated parts being shown for this purpose.

In their said operating positions, the blades extend generally outwardly from the body as shown in FIG. 5, but preferably with their center lines spaced from the axis of the body. Also in their said operating positions, the blades are inclined somewhat rearwardly as shown in FIG. 4. Centrifugal force tends to move the blades to positions perpendicular to the axis of the body, but the aerodynamic lift forces acting on the blades move them relatively rearwardly to an inclined position wherein there is an equilibrium between the centrifugal forces and the lift forces.

Except as moved by the before-described pitch adjusting means, the blades initially have a small negative pitch angle as illustrated in FIG. 16. This negative angle helps to maintain rotation in the direction for autorotation, but such rotation has been initiated by the before-described twirling motion induced by the inclination of the blades as shown in FIG. 1. If and when the said negative pitch angle induces a rotative speed in excess of a predetermined optimum speed, centrifugal forces cause the blades to move outwardly along their posts 16 as previously described. As they so move, the pitch angles are changed in the positive direction as previously described. FIG. 17 shows one blade moved to its extreme position wherein it has a substantial positive pitch angle. A pitch angle change as previously mentioned is either a decrease in a negative angle or an increase in a positive angle.

The pitch angle would not ordinarily be changed to the extent shown in FIG. 17, and the blades during autorotation would ordinarily be in positions between the FIG. 16 position and the FIG. 17 position wherein they would have small positive pitch angles. It is known that negative pitch angles are not necessary for sustaining autorotation. After being started, autorotation may be continued with the blades at small positive pitch angles. The beforementioned intermediate pitch positions would be reached when an equilibrium is established between the centrifugal forces tending to move the blades outward along the posts and the spring forces tending to move the blades inwardly. When this equilibrium is established, autorotation is continued at the predetermined optimum speed. Any departure from this optimum speed causes a corrective change in the pitch angles so as to restore the optimum speed.

The invention claimed is:

1. In an aerial device of the class described, the combination of a body having a longitudinal central axis and initially movable forwardly, a plurality of airfoil blades uniformly spaced circumaxially and pivotally connected near their rear ends to the rear portion of said body for movements about transverse axes in fixed relation to the body which blades initially extend forwardly from the last said axes and are in generally longitudinal positions, latches initially engaging said blades to positively retain them in their said forwardly extending generally longitudinal positions, and means carried by the body and movable relatively thereto and also movable relatively to and separately from the latches for withdrawing said latches out of engagement with the blades to permit said blades to swing in substantial unison outwardly and rearwardly about their said fixed transverse axes to positions wherein they extend generally outwardly from said body and wherein they are at pitch angles suitable to cause autorotation for retarding descent of said body in the forward direction.

2. In an aerial device of the class described, the combination of a body having a longitudinal central axis and initially movable forwardly, a plurality of airfoil blades uniformly spaced circumaxially and initially extending generally longitudinally with their central planes substantially radial and extending approximately through said central axis which blades are connected to said body near their rear ends for movements about substantially radial pivotal axes in fixed relation to said central axis and which blades are equally spaced transversely from said central axis and in the directions of their pivotal axes, means for initially retaining said blades in their said generally longitudinal positions, means for releasing said retaining means to permit the blades to swing in substantial unison outwardly and rearwardly about their said radial pivotal axes to positions wherein they extend generally outwardly from said body, and means operative when the blades are in their last said positions for locating them at pitch angles different from the fixed angles of said pivotal axes which pitch angles are effective for autorotation and for thereby retarding descent of said body in the forward direction.

3. In an aerial device of the class described, the combination of a body having a longitudinal central axis and initially movable forwardly, a plurality of airfoil blades uniformly spaced circumaxially and initially extending generally longitudinally with their central planes substantially radial and extending approximately through said central axis which blades are connected to said body near their rear ends for movements about substantially radial pivotal axes in fixed relation to said central axis and which blades are equally spaced transversely from said central axis, means for initially retaining said blades in their said generally longitudinal positions, means for releasing said blade retaining means to permit the blades to swing in substantial unison outwardly and rearwardly about their said radial pivotal axes to positions wherein they extend generally outwardly from said body, means operative when the blades are in their last said positions for locating them at pitch angles different from the fixed angles of said pivotal axes which pitch angles are effective for autorotation and for thereby retarding descent of said body in the forward direction, and means automatically dependent upon variations in the speed of autorotation for changing the pitch angles of the blades in the positive direction as the rotational speed is increased and for changing said pitch angles in the negative direction as the rotational speed is decreased.

4. In an aerial device of the class described, the combination of a body having a longitudinal central axis and initially movable forwardly, a plurality of pivot posts connected with the rear portion of said body with their axes in fixed relation thereto which posts are uniformly spaced circumaxially and extend transversely from said central axis, a plurality of airfoil blades mounted on said posts for pivotal movement about the post axes and also mounted for movements along said posts away from and toward said central axis, said blades being equally spaced transversely from said central axis and extending approximately perpendicularly to the pivotal axes of said posts and generally outwardly from said body and said blades having pitch angles suitable to cause autorotation for retarding descent of said body in the forward direction, a plurality of springs connected respectively with said posts and said blades for resisting movements of the blades along the posts and away from the central axis as the result of centrifugal force, and a plurality of means connected respectively with said posts and blades for changing the pitch angles of the blades in the positive direction when the blades move along the posts and away from the central axis and for changing said pitch angles in the negative direction when the blades move along the posts and toward the central axis.

5. In an aerial device of the class described, the combination of a body having a longitudinal central axis and initially movable forwardly, a plurality of pivot posts connected with hte rear portion of said body with their axes radial and in fixed relation to the body which posts are spaced circumaxially, a plurality of generally outwardly extending airfoil blades mounted near their inboard ends for pivotal movement about the radial axes of said posts and also mounted for movements along said posts away from and toward said central axis, said blades being equally spaced transversely from said central axis and extending approximately perpendicularly to said pivotal axes of said posts and said blades having pitch angles suitable to cause autorotation for retarding descent of said body in the forward direction, a plurality of springs connected respectively with said posts and said blades for resisting movements of the blades along the posts and away from said central axis as the result of centrifugal force, and a plurality of means connected respectively with said posts and blades for changing the pitch angles of the blades in the positive direction when the blades move along the posts and away from said central axis and for changing said pitch angles in the negative direction when the blades move along the posts and toward the central axis.

6. In an aerial device of the class described, the combination of a body having a longitudinal central axis and initially movable forwardly, a plurality of pivot posts connected with the rear portion of said body and uniformly spaced circumaxially which posts are radial and in fixed relationship to the body, a plurality of blade carriers mounted on said posts for movement therealong away from and toward said central axis which blade carriers are equally spaced transversely from said central axis, a plurality of airfoil blades connected respectively with said blade carriers for pivotal movements about pitch axes extending lengthwise of the blades which blades extend perpendicularly to the pivotal axes of said posts and generally outwardly from the body and which blades have pitch angles suitable to cause autorotation for retarding descent of said body in the forward direction, a plurality of springs connected respectively with said posts and said blade carriers for resisting movements of the carriers and blades along the posts and away from the central axis as the result of centrifugal force, and a plurality of means connected respectively with said blades for swinging the blades about their said pitch axes when the carriers and blades move along said posts, the last said means being constructed and arranged to change said pitch angles in the positive direction when the carriers and blades move away from the central axis as the result of increased rotative speed and to change said pitch angles in the negative direction when the carriers and the blades move toward the central axis as the result of decreased rotative speed.

7. In an aerial device of the class described, the combination of a body having a longitudinal central axis and initially movable forwardly, a plurality of pivot posts connected with the rear portion of said body and uniformly spaced circumaxially, said posts being connected for relative rotative movement about their own axes which axes are radial and in fixed relationship to the body, a plurality of blade carriers mounted on said posts for movement therealong away from and toward said central axis which blade carriers are equally spaced transversely from said central axis, a plurality of airfoil blades connected respectively with said blade carriers for pivotal movements about pitch axes extending lengthwise of the blades which blades extend approximately perpendicularly to the pivotal axes of said posts and generally outwardly from the body and which blades have pitch angles suitable to cause autorotation for retarding descent of said body in the forward direction, a plurality of springs connected respectively with said posts and said blade carriers for resisting movements of the carriers and blades along the posts and away from the central axis as the result of centrifugal force, and means including a plurality of pairs of interengaged cam elements connected respectively with said posts and blades for swinging the blades about their said pitch axes when the carriers and blades move along said posts, the last said means being constructed and arranged to change said pitch angles in the positive direction when the carriers and blades move away from the central axis as the result of increased rotative speed and to change said pitch angles in the negative direction when the carriers and the blades move toward the central axis as the result of decreased rotative speed.

8. In an aerial device of the class described, the combination of a body having a longitudinal central axis and initially movable forwardly, a plurality of airfoil blades uniformly spaced circumaxially and initially extending generally longitudinally with their central planes substantially radial and extending approximately through said central axis which blades are connected to said body near their rear ends for movements about fixed substantially radial pivotal axes and which blades are equally spaced transversely from said central axis, a plurality of approximately radial posts fixedly connected with the body adjacent the forward ends of said longitudinally extending blades, latches carried respectively by said posts and initially engaging respectively with said blades for retaining said blades in their said generally longitudinal positions, and means also carried respectively by said posts and movable relatively thereto and separately from said blade retaining latches for simultaneously releasing said latches to permit the blades to swing in substantial unison outwardly and rearwardly about their said fixed radial pivotal axes to positions wherein they extend generally outwardly from said body and wherein they are at pitch angles suitable to cause autorotation for retarding descent of said body in the forward direction.

9. In an aerial device of the class described, the combination of a body having a longitudinal central axis and initially movable forwardly, a plurality of airfoil blades uniformly spaced circumaxially and initially extending generally longitudinally with their central planes substantially radial which blades are connected to said body near their rear ends for movements about fixed substantially radial pivotal axes and which blades are equally spaced transversely from said central axis, a plurality of approximately radial posts fixedly connected with the body adjacent the forward ends of said longitudinally extending blades which posts respectively have rearwardly open longitudinal holes therein parallel to said central axis and also have radial central holes therein perpendicular to said central axis, a plurality of latch pins respectively in said longitudinal holes initially engaging respectively with said blades for retaining said blades in their said generally longitudinal positions, a plurality of actuating pins respectively in the radial central holes in said posts and engageable with said latch pins so that the last said pins are moved forwardly when the actuating pins are moved radially, and means for simultaneously moving said actuating pins radially so as to withdraw said latch pins and thus permit the blades to swing in substantial unison outwardly and rearwardly about their said fixed radial pivotal axes to positions wherein they extend generally outwardly from said body and wherein they are at pitch angles suitable to cause autorotation for retarding descent of said body in said forward direction.

10. In an aerial device as set forth in claim 9, the combination wherein there are two latch pins, wherein there are two actuating pins, wherein the two actuating pins are movable in opposite radial directions to respectively withdraw said latch pins, and wherein a single means is provided for simultaneously moving said actuating pins in said opposite directions.

11. In an aerial device movable with and at the rear of a missile and adapted to serve as a booster during initial forward flight, the combination of a case having a longitudinal central axis adapted to coincide with the missile axis during said initial forward flight which case is adapted for containing a combustible charge and is open at the rear for the discharge of propellant gases, a plurality of airfoil blades uniformly spaced circumaxially and initially extending generally longitudinally along the case each of which blades is disposed entirely at one side of the case with its central plane substantially radial and extending approximately through said central axis, means for connecting said blades to said case near their rear ends for movements about fixed substantially radial pivotal axes, means for initially retaining said blades to prevent movements thereof about said pivotal axes so that said blades remain generally longitudinal and serve as guide vanes for said case during said flight, means automatically operable after a period of flight for releasing said blade retaining means to permit the blades to swing in substantial unison rearwardly and outwardly about said pivotal axes to positions wherein they extend generally outwardly from said case, and means operative when the blades are in their last said positions for locating them at pitch angles different from the fixed angles of said pivotal axes which pitch angles are effective for causing autorotation and for thereby retarding descent of said body in the forward direction.

12. In an aerial device movable with and at the rear of a missile and adapted to serve as a booster therefor during initial forward flight, the combination of a case having a longitudinal central axis and adapted for containing a combustible charge which case is open at the rear for the discharge of propellent gases and which case during said forward flight has its said axis coincident with the missile axis, a plurality of airfoil blades uniformly spaced circumaxially and initially extending generally longitudinally along the case each of which blades is disposed entirely at one side of the case with its central plane substantially radial and extending approximately through said central axis, means for connecting said blades to said case for relative movements about fixed radial pivotal axes, means for initially retaining said blades to prevent movements thereof about said radial pivotal axes so that said blades remain generally longitudinal but nevertheless at slight angles of inclination with respect to said longitudinal axis, said blades thus serving as guide vanes for said case during said flight and also serving to effect twirling motion of said case and blades, means automatically operable after a period of forward flight for releasing said blade retaining means to permit swinging of the blades in substantial unison rearwardly and outwardly about said fixed pivotal axes to positions wherein they extend generally outwardly from said case, said blade inclinations and said twirling motion serving to effect the said swinging of the blades about their said pivotal axes, and means operative when the blades are in their last said positions for locating them at pitch angles different from the fixed angles of said pivotal axes which pitch angles are effective for causing autorotation and for thereby retarding descent of said body in the forward direction.

13. In an aerial device as set forth in claim 12, the combination wherein there is provided means automatically dependent upon variations in the speed of autorotation for changing the pitch angles of the blades in the positive direction as the rotational speed is increased and for changing said pitch angles in the negative direction as the rotational speed is decreased.

14. An aerial device constituting one unit of a multiple unit missile assembly which is adapted for free flight along a trajectory while free from any external supporting means, said device comprising a body having a longitudinal central axis, a plurality of uniformly spaced and initially longitudinal airfoil blades connected with the body and rotatable in unison about said central axis in a predetermined direction, means for guiding the blades for pivotal movements relatively to the body and about transverse axes to operative positions wherein they extend generally outwardly and are at pitch angles suitable for autorotation of the blades to retard descent of said body, means enabling the blades to move relatively to the body about pitch axes extending generally lengthwise of the blades, means connected with the body for initially retaining said blades to prevent pivotal movements thereof about said transverse axis, said blades upon release of said retaining means being automatically biased for pivotal movements to said operative positions, means operable after an extensive period of flight for releasing said retaining means to permit the blades to pivotally move in accordance with their bias to said operative positions wherein they will autorotate and retard descent, and means automatically dependent upon variations in the speed of autorotation for pivotally moving the blades about their said pitch axes so as to change the pitch angles of the blades in the positive direction in accordance with increased rotative speeds and so as to change the pitch angles of the blades in the negative direction in accordance with decreased rotative speeds.

15. An aerial device as set forth in claim 14, wherein said means dependent upon variations in the speed of autorotation is constructed and arranged to utilize the centrifugal action of the rotating blades for effecting said changes in pitch angles.

16. In an aerial device movable with and at the rear of a missile and adapted to serve as a booster therefor during initial forward flight, the combination of a case having a longitudinal central axis and adapted for containing a combustible charge which case is open at the rear for the discharge of propellent gases and which case during initial forward flight has its said axis coincident with the missile axis, a plurality of airfoil blades uniformly spaced circumaxially and initially extending generally longitudinally along the case with their central planes substantially radial, means for connecting the several blades with the case for movements relatively thereto in similar fixed paths, means for initially retaining said blades to prevent relative movements thereof in said fixed paths so that said blades remain generally longitudinal and serve as guide vanes during said flight, means for releasing said blade retaining means to permit the blades to move in substantial unison in their said fixed paths to positions wherein they extend generally outwardly from said case and wherein they are at pitch angles suitable for retarding descent of said case, and a mechanism dependent upon the separation of said booster case from said missile for actuating said releasing means.

17. In an aerial device movable with and at the rear of a missile and adapted to serve as a booster therefor during initial forward flight, the combination of a case having a longitudinal central axis and adapted for containing a combustible charge which case is open at the rear for the discharge of propellent gases and which case during initial forward flight has its said axis coincident with the missile axis, a plurality of airfoil blades uniformly spaced circumaxially and initially extending generally longitudinally along the case with their central planes substantially radial, means for connecting the several blades with the case for movements relatively thereto in similar fixed paths, means for initially retaining said blades to prevent relative movements thereof in said fixed paths so that said blades remain generally longitudinal and serve as guide vanes during said flight, and a mechanism for releasing said blade retaining means to permit the blades to move in substantial unison in their said fixed paths to positions wherein they extend generally outwardly from said case and wherein they are at pitch angles suitable for retarding descent of said case, said mechanism including an element at the front of the case and biased for forward movement and engageable with said missile to prevent said forward movement except upon separation of said case from said missile and said mechanism also including means responsive to forward movement of said element for effecting release of said blade retaining means.

18. In an aerial device movable with and at the rear of a missile and adapted to serve as a booster therefor during initial forward flight, the combination of a case having a longitudinal central axis and adapted for containing a combustible charge which case is open at the rear for the discharge of propellent gases and which case during initial forward flight has its said axis coincident with the missile axis, a plurality of airfoil blades uniformly spaced circumaxially and initially extending generally longitudinally along the case, means for connecting the several blades with the case for movements relatively thereto in similar fixed paths, means for initially retaining the respective blades to prevent relative movements thereof in said fixed paths so that said blades remain generally longitudinal, mechanism including explosive charges serving upon explosion to release said blade retaining means and to thus permit the blades to move in substantial unison in their said fixed paths to positions wherein they extend generally outwardly from said case and wherein they are at pitch angles suitable for retarding descent of said case, and means including ignition devices for said explosive charges and including a normally open electrical circuit extending to said ignition devices and further including a member movable upon separation of said case from said missile and thereupon serving to close said circuit and to thereby simultaneously effect ignition of said explosive charges.

19. In an aerial device movable with and at the rear of a missile and adapted to serve as a booster therefor during initial forward flight, the combination of a case having a longitudinal central axis and adapted for containing a combustible charge which case is open at the rear for the discharge of propellent gases and which case during initial forward flight has its said axis coincident with the missile axis, a plurality of airfoil blades uniformly spaced circumaxially and initially extending generally longitudinally along the case with their central planes substantially radial, means for connecting the several blades with the case for movements relatively thereto in similar fixed paths, means for initially retaining the respective blades to prevent relative movements thereof in said fixed paths so that said blades remain generally longitudinal and serve as guide vanes during said flight, mechanism including explosive charges serving upon explosion to release said blade retaining means and to thus permit the blades to move in substantial unison in their said fixed paths to positions wherein they extend generally outwardly from said case and wherein they are at pitch angles suitable for retarding descent of said case, and means including ignition devices for said explosive charges and including an electrical circuit extending to said ignition devices and further including a member movable upon separation of said case from said missile and thereupon serving to close said circuit and to thereby simultaneously effect ignition of said explosive charges.

20. In an aerial device movable with and at the rear of a missile and adapted to serve as a booster therefor during initial forward flight, the combination of a case having a longitudinal central axis and adapted for containing a combustible charge which case is open at the rear for the discharge of propellent gases and which case during initial forward flight has its said axis coincident with the missile axis, a plurality of airfoil blades uniformly spaced circumaxially and initially extending generally longitudinally along the case with their central planes substantially radial, means for connecting the several blades with the case for movements relatively thereto in similar fixed paths, latches for initially retaining the respective blades to prevent relative movements thereof in said fixed paths so that said blades remain generally longitudinal and serve as guide vanes during said flight, mechanism including explosive charges serving upon explosion to release said latches to permit the blades to move in substantial unison in their said fixed paths to positions wherein they extend generally outwardly from said case and wherein they are at pitch angles sutiable for retarding descent of said case, means including ignition devices for said explosive charges and including an initially open electrical circuit extending to said igniton devices and a normally open switch in said electrical circuit, and means for automatically effecting the closing of the switch upon separation of said case from said missile, said switch upon closing serving to simultaneously effect ignition of said explosive charges.

21. In an aerial device movable with and at the rear of a missile and adapted to serve as a booster therefor during initial forward flight, the combination of a body having a longitudinal central axis and adapted for containing a combustible charge which case is open at the rear for the discharge of propellent gases and which case during initial forward flight has its said axis coincident with the missile axis, a plurality of airfoil blades uniformly spaced circumaxially and initially extending generally longitudinally with their central planes substantially radial which blades are connected to said body near their rear ends for movements about fixed substantially radial pivotal axes and which blades are equally spaced transversely from said central axis, a plurality of approximately radial posts fixedly connected with the body adjacent the forward ends of said longitudinally extending blades which posts respectively have rearwardly open longitudinal holes therein parallel with said central axis and also have radial central holes therein perpendicular to said central axis, a plurality of latch pins respectively in said longitudinal holes initially engaging respectively with said blades for retaining said blades in their said generally longitudinal positions, a plurality of actuating pins respectively in the radial central holes in said posts and engageable with said latch pins so that the last said pins are moved forwardly when the actuating pins are moved radially, explosive charges adjacent said actuating pins and serving upon explosion to move the last said pins, and means including ignition devices for said explosive charges and including an electrical circuit extending to said ignition devices and further including a member movable upon separation of said case from said missile and thereupon serving to close said circuit and to thereby simultaneously effect ignition of said explosive charges.

22. An aerial device constituting one unit of a multiple unit missile assembly which is adapted for free flight along a trajectory while free from any external supporting means, said device comprising a body having a longitudinal central axis, a plurality of uniformly spaced and initially longitudinal airfoil blades connected with the body and rotatable in unison about said central axis in a predetermined direction, means for guiding the blades for pivotal movements relatively to the body and about transverse axes to operative positions wherein they extend generally outwardly and are at pitch angles suitable for autorotation of the blades to retard descent of said body, means for initially retaining said blades to prevent pivotal movements thereof about said transverse axes, said blades upon release of said retaining means being automatically biased for pivotal movements to said operative positions, and means dependent upon the separation of two units of the missile assembly after an extensive period of flight along said trajectory for releasing said retaining means to permit the blades to move in accordance with their bias about said transverse axes and to said operative positions wherein they will autorotate and retard descent.

23. An aerial device constituting one unit of a multiple unit missile assembly which is adapted for free flight along a trajectory while free from any external supporting means, said device comprising a body having a longitudinal central axis, a plurality of uniformly spaced and initially longitudinal airfoil blades connected with the body and rotatable in unison about said central axis in a predetermined direction, means for guiding the blades for pivotal movements relatively to the body and about transverse axes to operative positions wherein they extend generally outwardly and are at pitch angles suitable for autorotation of the blades to retard descent of said body, means enabling the blades to move relatively to the body about pitch axes extending generally lengthwise of the blades, means connected with the body for initially retaining said blades to prevent pivotal movements thereof about said transverse axis, said blades upon release of said retaining means being automatically biased for pivotal movements to said operative positions, means dependent upon the separation of two units of the missile assembly after an extensive period of flight along said trajectory for releasing said retaining means to permit the blades to move in accordance with their bias about said transverse axes and to said operative positions wherein they will autorotate and retard descent, and means automatically dependent upon variations in the speed of autorotation for pivotally moving the blades about their said pitch axes so as to change the pitch angles of the blades in the positive direction in accordance with increased rotative speeds and so as to change the pitch angles of the blades in the negative direction in accordance with decreased rotative speeds.

24. An aerial device as set forth in claim 23, wherein said means dependent upon variations in the speed of autorotation is constructed and arranged to utilize the centrifugal action of the rotating blades for effecting said changes in pitch angles.

References Cited in the file of this patent

UNITED STATES PATENTS

| | | |
|---|---|---|
| 1,036,122 | Kellogg | Aug. 20, 1912 |
| 1,464,339 | Radon | Aug. 7, 1923 |
| 1,880,586 | Tiling | Oct. 4, 1932 |
| 1,964,016 | Wiley | June 26, 1934 |
| 2,405,415 | Eksergian | Aug. 6, 1946 |
| 2,468,795 | Winters | May 3, 1949 |
| 2,509,481 | Crise | May 30, 1950 |
| 2,526,451 | Bensen | Oct. 17, 1950 |
| 2,545,736 | Isacco | May 20, 1951 |
| 2,746,207 | Starkey | May 22, 1956 |
| 2,870,710 | Miedel | Jan. 27, 1959 |